United States Patent
Muller et al.

[11] Patent Number: 6,064,040
[45] Date of Patent: May 16, 2000

[54] METHOD AND APPARATUS FOR THE LOCALIZATION OF HEATING IN A TEMPERING FURNACE FOR GLASS PANELS

[75] Inventors: Didier Muller, Morteau, France; Olivier Muller; Volker Thiessen, both of La Chaux-de-Fonds, Switzerland

[73] Assignee: Tamglass LTD Oy, Tampere, Finland

[21] Appl. No.: 09/252,026

[22] Filed: Feb. 18, 1999

[30] Foreign Application Priority Data

Feb. 18, 1998 [FI] Finland ........................ 980369

[51] Int. Cl.[7] ........................................ F27B 9/06
[52] U.S. Cl. .................. 219/388; 219/400; 219/411; 219/518; 65/114
[58] Field of Search ..................... 219/388, 400, 219/411, 412, 508, 518; 264/492; 432/11, 12, 122; 65/114, 117, 118, 162, 273

[56] References Cited

U.S. PATENT DOCUMENTS

| | | | |
|---|---|---|---|
| 4,505,671 | 3/1985 | McMaster | 432/144 |
| 5,337,393 | 8/1994 | Reunamaki | 392/417 |
| 5,424,512 | 6/1995 | Turetta et al. | 219/464 |

FOREIGN PATENT DOCUMENTS

| | | |
|---|---|---|
| 592862 | 4/1994 | European Pat. Off. |
| 0 649 821 | 4/1995 | European Pat. Off. |
| 659697 | 6/1995 | European Pat. Off. |
| 721922 | 7/1996 | European Pat. Off. |
| 98/01398 | 1/1998 | WIPO |

*Primary Examiner*—Teresa Walberg
*Assistant Examiner*—Shawntina Fuqua
*Attorney, Agent, or Firm*—Burns, Doane, Swecker & Mathis, L.L.P.

[57] ABSTRACT

The invention relates to a method and apparatus for the localization or focusing of heating in a tempering furnace for glass panels. Glass panels are carried and supported in a furnace (2) by rollers (11). The furnace is provided with upper and lower nozzle boxes (4, 14), including nozzle heads (5, 15) for blasting hot convection air to heat the glass panels to a tempering temperature. The arrival of a load in the furnace is preceded by reading a load picture and by controlling radiation heat resistances (10) present in the furnace in such a way that radiation heating can be focused on the central areas of critical glass panels to provide extra heating therefor.

12 Claims, 4 Drawing Sheets

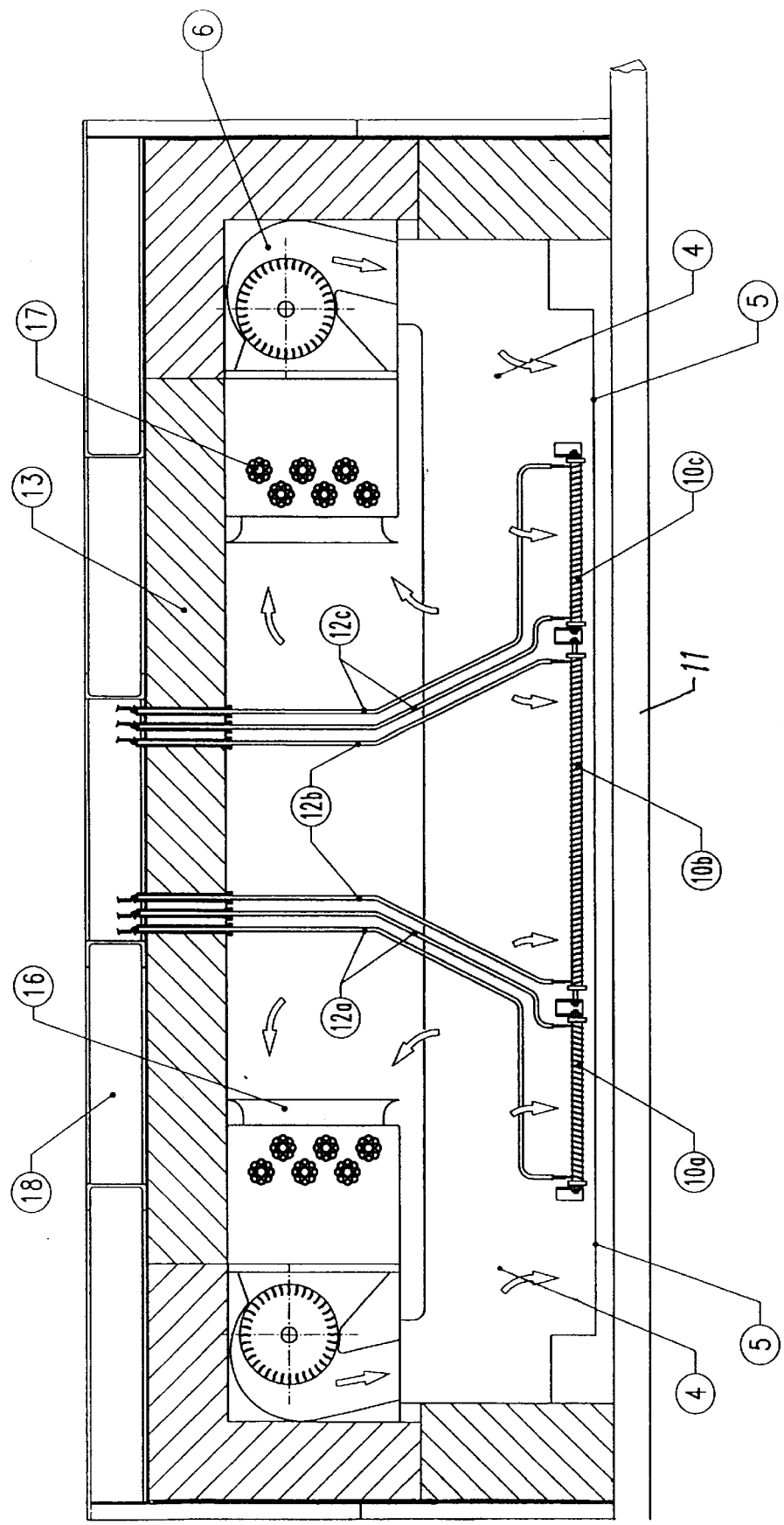

METHOD AND APPARATUS FOR THE LOCALIZATION OF HEATING IN A TEMPERING FURNACE FOR GLASS PANELS

FIELD OF THE INVENTION

The present invention relates to a method for the localization of heating in a tempering furnace for glass panels, wherein the glass panels are carried and supported by rollers and heated to a desired tempering temperature with hot convection air blasted to the opposite surfaces of the glass panels.

The invention relates also to an apparatus for the localization of heating in a tempering furnace for glass panels, which is provided with rollers for carrying the glass panels, nozzle boxes with nozzles for blasting hot convection air to the opposite surfaces of a glass panel, blowers in a flow communication with the nozzle boxes, intake ports within the furnace in a flow communication with the blowers, and heating resistances for heating the air circulated by the blowers.

BACKGROUND OF THE INVENTION

This type of method and apparatus is disclosed in the Patent publication EP-649821. The heating of glass panels with a convection air blast involves certain problems in terms of providing the glass panels with a uniform distribution of heat over the entire surface area. In particular, the border areas of sizable glass panels tend to heat more than the central areas.

SUMMARY OF THE INVENTION

An object of the invention is to provide a method and apparatus of the above type, capable of controlling more effectively than before the temperature distribution over various areas of a load or individual glass panels to be heated in a convection furnace.

BRIEF DESCRIPTION OF THE DRAWINGS

One exemplary embodiment of the invention will now be described in more detail with reference made to the accompanying drawings, in which

FIG. 3 shows a top section of the furnace of FIG. 2 in a cross-section.

DETAILED DESCRIPTION OF THE INVENTION

Figure 1:
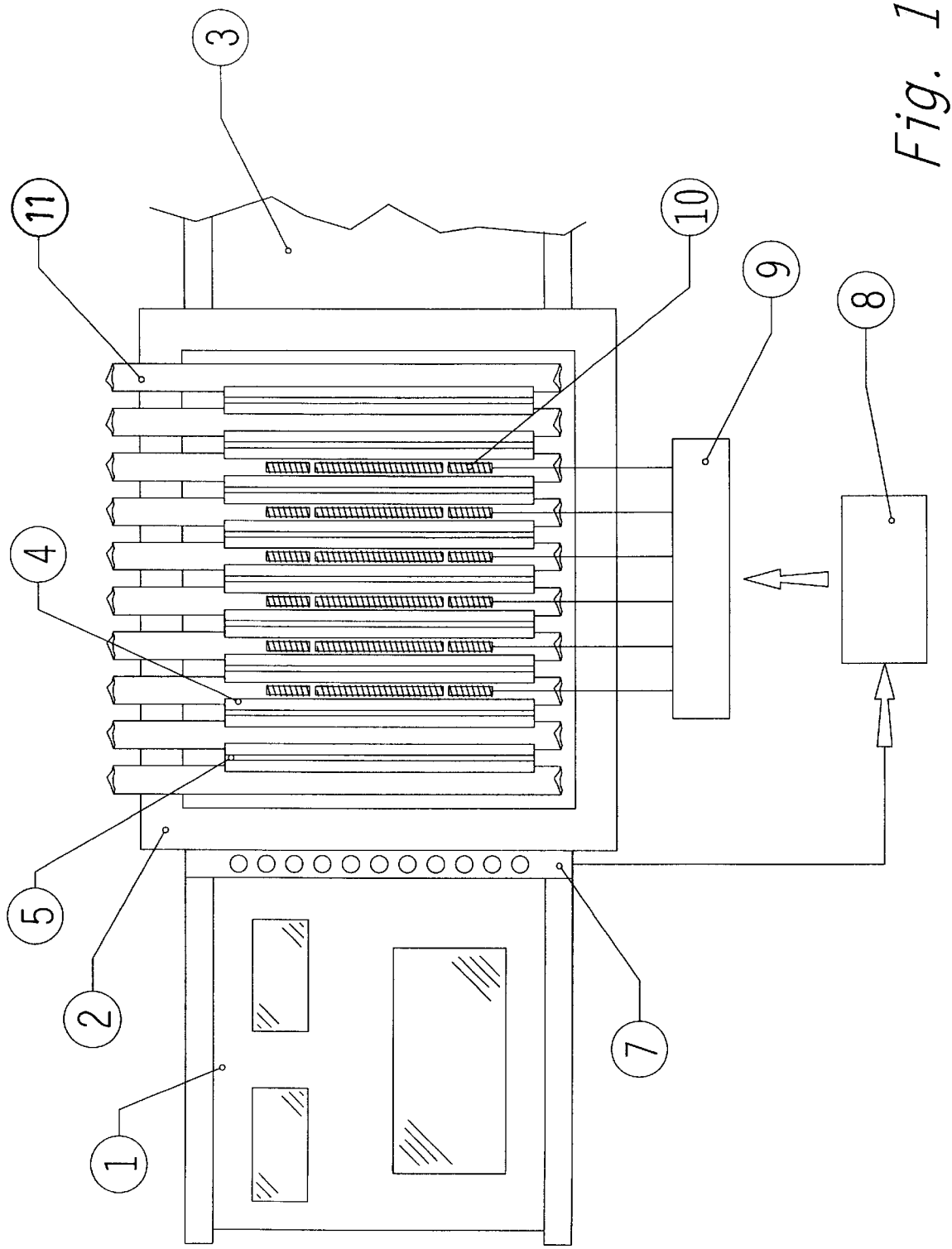
FIG. 1 shows in a schematic plan view an apparatus for implementing a method of the invention.
Figure 2:
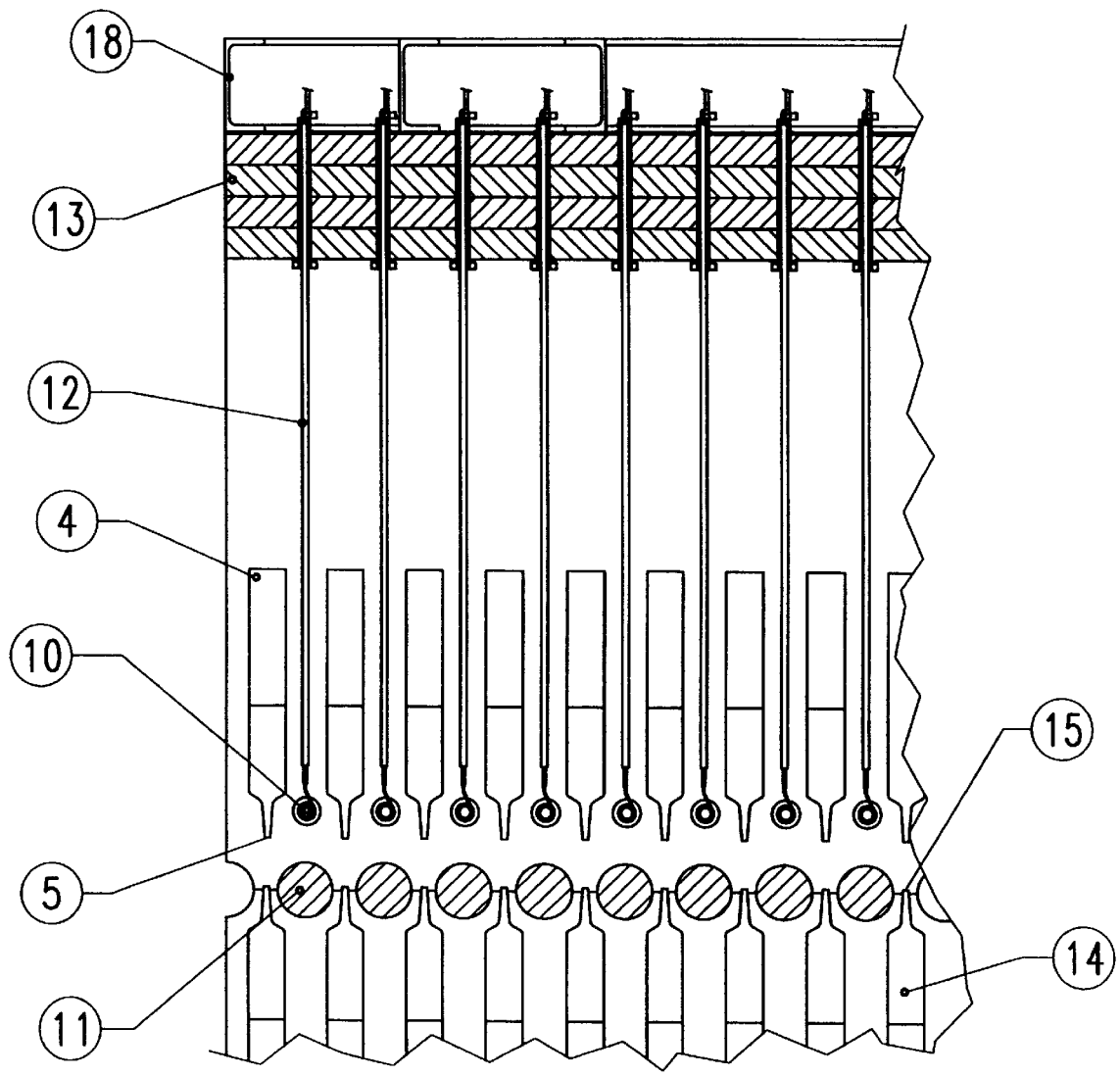
FIG. 2 shows in a vertical section a convection heating furnace included in an apparatus of the invention, provided with an arrangement of the invention for localized extra heating.
Figure 2A:
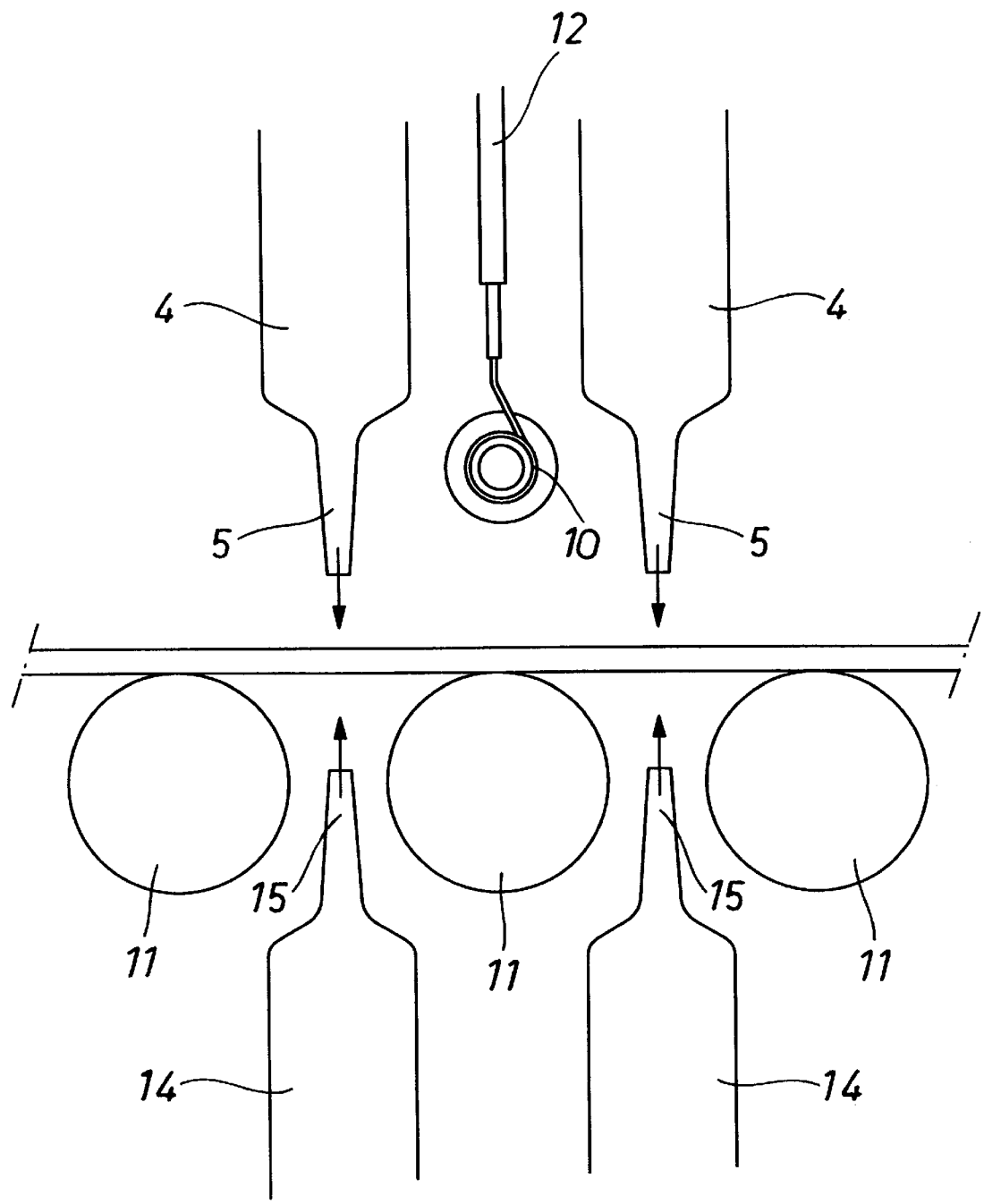
FIG. 2A shows a detail of FIG. 2 in a larger scale.

The description deals first with an apparatus for implementing the method. The apparatus shown in FIG. 1 includes a loading table 1, a convection heating furnace 2, and a chilling station 3. As depicted in more detail in FIGS. 2 and 3, the furnace 2 is provided with nozzle boxes 4 above and nozzle boxes 14 below conveyor rollers 11. The blast of hot convection air for heating a glass panel is effected from nozzle heads 5, 15 associated with the nozzle boxes 4, 14, the nozzles present therein comprising e.g. slit nozzles, jet orifices or jet pipes. The convection air circulation is effected by means of blowers 6, which are in a flow communication with intake ports 16 opening into the furnace. Between the blowers 6 and the intake ports 16 are resistances 17 for heating the air to be circulated. FIG. 3 illustrates an overhead air circulation system, and a respective circulation system is constructed below the array of rollers 11.

The nozzle boxes 4, 14 are parallel to the rollers 11 and the nozzle heads 5, 15 concentrate a blast between the rollers 11.

For the purposes of localized extra heating, the furnace is provided, between the upper nozzle heads 5, with resistances 10 which are spaced in a lateral direction of the furnace as discrete resistances 10a, 10b, 10c, which are selectively switchable on and off, whereby the extra heating can be performed either by means of the middle resistances 10b or with either one of the side resistances 10a, 10c or with a combination of the middle resistance 10b and either one of the side resistances 10a, 10c. As for the resistances arranged successively lengthwise of the furnace, it is possible to switch on one or more resistances anywhere along the length of the furnace.

The resistances 10a have their own power cables 12a, the resistances 10b have their own power cables 12b, and the resistances 10c have their own power cables 12c. The cable system 12 is extended through a heat-insulated furnace roof 13 and connected to current distribution rails present within housings 18. These are in turn connected to a unit 9, fitted with controlled current switches which are operated by means of a computer-aided control system 8. On the other hand, the control system 8 receives the control-required information from scanning or detecting means 7, located in the loading station 1 or between the loading station 1 and the furnace 2. The scanning and detecting means 7 can be based e.g. on the back-reflection of electromagnetic radiation or sound waves from glass. The means 7 may also comprise CCD-cameras or video cameras. The scanning or detecting means 7 are used for reading the load picture of glass panels, i.e. the dimensions and positions of individual glass panels. It is also possible to use glass-contact scanning, e.g. by means of yielding rollers, or scanning carried out by means of small air jets, in which case the jets, when in line with the glass panels, do not transmit the plane of passage of the glass panels. The read load picture is stored in the memory of the control system 8 and compared with predetermined parameters. The comparison results in the identification of critical glass panels, and the resistances 10 are used for focusing radiation heating on the central areas of the critical glass panels for providing extra heating therefor.

The control system 8 may also include a load picture monitor, displaying at the same time a matrix for a multi-zonal radiation heating system and resistances activated for heating at any given time. By means of a display of this type, it is possible to teach the system to choose automatically a given resistance heating picture for a given load picture, such that the extra heating is always focused on the central areas of critical glass panels. The control system 8 includes a program which makes use of preset parameter data to determine the degree of extra heating required for a given glass panel in terms of its thickness, width and length. This requirement for extra heating may still vary according to whether the glass panel is positioned in the mid-section or side section of a furnace. Thus, a decision in terms of resistances to be selectively activated is made automatically on the basis of the program and parameter data used thereby. It is possible to vary such parameter data manually on the basis of operating experiences.

In addition to a resistance picture to be selected, it is of course necessary to make a decision about the starting moment and duration of extra heating in terms of each resistance or resistance zone. This decision is also made on the basis of a communication between the visualization system and the control computer. the selected resistances or resistance zones switch automatically on and off and this switching action can be visible on the monitor of the control system 8 along with a load picture.

The heating resistances 10 may comprise a wound single-wire electrical resistance or double-coated direct resistances (e.g. Thermociax from Philips). The radiation heating elements must be quick in terms of the action time thereof. In addition to overhead radiation heaters, it is possible to employ lower radiation heaters underneath the rollers 11. As an alternative, the resistance heaters 10 can be fitted in the nozzle boxes 4 for producing the locally focused and temporally controlled overheating of convection air to be blasted.

The heating resistances 10 have an outer diameter and positioning between the nozzle heads dimensioned in such a way that the pressure loss of circulation air will be increased as little as possible thereby. In order to achieve this, it is preferred that the distance between the heating elements 10 and the external side surfaces of the nozzle heads 5 be greater than or equal to a half of the minimum distance between the nozzle boxes 4.

Since extra or supplemental heating is not required near the sidelines of a furnace, the resistances 10a, 10b, 10c, set one after the other laterally of the furnace, are only adapted to extend beyond the mid-section of the furnace by about $\frac{2}{3}$ of the width of the furnace, providing the edges of the furnace with zones not occupied by resistances. The resistances 10 may cover the entire length of a furnace between all nozzle boxes 4 or just part of the length of a furnace between just a few nozzle boxes.

The invention is not limited to the use of automated visualization system of the load pattern.

The operator may manually select (by push buttons) one of different radiation heat localization programs after having visually assessed the load pattern or dimensions of a glass panel. For instance, if large glass panels of predetermined width are loaded, the operator selects a push button, which is indicated to be used by large glass panels having their width within a predetermined range.

What is claimed is:

1. A method for the localization of heating in a tempering furnace for glass panels, wherein the glass panels are carried and supported by rollers and heated to a desired tempering temperature with hot convection air blasted to the opposite surfaces of the glass panels, wherein, simultaneously with convection heating, a glass panel is heated with radiation heat focusable on at least one zone laterally of the furnace, the focusing of the radiation heat being controlled on the basis of at least one of pre-detected positions and pre-measured dimensions of glass panels included in each load.

2. A method as set forth in claim 1, comprising scanning a load picture of glass panels or the dimensions and positions of individual glass panels on a loading table or from a load on its way into a furnace, storing the load picture in a memory of a control system, comparing the dimensions and positions of individual glass panels to predetermined parameters, using the comparative result for identifying critical glass panels in a load and focusing the radiation heating on central areas of the critical glass panels for providing extra heating therefor.

3. A method as set forth in claim 2, wherein a starting moment and duration of the focused radiation heating are set programmatically on the basis of a result of said comparison.

4. An apparatus for localization of heating in a tempering furnace for glass panels, comprising rollers for carrying the glass panels, nozzle boxes with nozzle heads for blasting hot convection air to opposite surfaces of the glass panels, blowers in a flow communication with the nozzle boxes, intake ports within the furnace in flow communication with the blowers, heating resistances for heating air circulated by the blowers, radiation heating resistances fitted in gaps between the nozzle boxes and extending laterally relative to a longitudinal axis of the furnace and spaced laterally of the furnace as discrete radiation heating resistances, said radiation heating resistances being individually switchable on and off, with the switch-on and switch-off action of said radiation heating resistances being adapted to be controlled on the basis of at least one of the size and load picture of glass panels in such a way that central areas of at least sizable glass panels receive extra heating from said radiation heating resistances, with main heating being adapted to be provided by convection blasting.

5. An apparatus as set forth in claim 4, wherein the nozzle heads associated with the nozzle boxes are slit nozzles extending laterally of the furnace, and wherein a plurality of radiation heating resistances, provided with a separate power supply, are mounted successively laterally of the furnace between two of the given slit nozzles.

6. An apparatus as set forth in claim 5, wherein the radiation heating resistances, set one after the other laterally of the furnace, extend across a mid-section of the furnace to cover just part of the width of the furnace and provide side areas of the furnace with zones not covered by the radiation heating resistances.

7. An apparatus as set forth in claim 4, wherein the distance of the radiation heating resistances from external side surfaces of an adjacent nozzle head is greater than or equal to one-half of the minimum distance between the nozzle boxes.

8. An apparatus as set forth in claim 4, wherein a loading station or a space between the furnace and the loading station is provided with means for reading a load picture and transferring the load picture into a control system, which is adapted to automatically control the switch-on and switch-off action of said radiation heating resistances.

9. An apparatus as set forth in claim 6, wherein a portion of the furnace width covered by the radiation heating resistances is smaller than that covered by the nozzle heads.

10. An apparatus for localization of heating in a tempering furnace for glass panels, comprising rollers for carrying the glass panels, nozzle boxes with nozzle heads for blasting hot convection air to opposite surfaces of the glass panels, blowers in a flow communication with the nozzle boxes, intake ports within the furnace in flow communication with the blowers, heating resistances for heating air circulated by the blowers, radiation heating resistances fitted in gaps between the nozzle boxes and extending laterally relative to a longitudinal axis of the furnace and spaced laterally of the furnace as discrete radiation heating resistances, said radiation heating resistances being individually switchable on and off, with the switching-on and switching-off of said radiation heating resistances being adapted to be controlled on the basis of at least one of the size and load picture of glass panels in such a way that central areas of at least sizable glass panels receive extra heating from said radiation heating resistances, with main heating being adapted to be provided by convection blasting, wherein the distance of the radiation heating resistances from external side surfaces of an adjacent nozzle head is greater than or equal to one-half of the minimum distance between the nozzle boxes.

11. An apparatus as set forth in claim 10, wherein the nozzle heads associated with the nozzle boxes are slit nozzles extending laterally of the furnace, and wherein a plurality of radiation heating resistances, provided with a separate power supply, are mounted successively laterally of the furnace between two of the given slit nozzles.

12. An apparatus as set forth in claim 11, wherein the radiation heating resistances, set one after the other laterally of the furnace, extend across a mid-section of the furnace to cover just part of the width of the furnace and provide side areas of the furnace with zones not covered by the radiation heating resistances.

* * * * *